(12) United States Patent
Fleytman (10) Patent No.: US 6,537,174 B2
(45) Date of Patent: Mar. 25, 2003

(54) DRIVE AXLE ASSEMBLY WITH WORM GEARSET AND DIFFERENTIAL

(76) Inventor: Yakov Fleytman, 3233 Hickory Dr., Lake Orion, MI (US) 48359

( * ) Notice: Subject to any disclaimer, the term of this patent is extended or adjusted under 35 U.S.C. 154(b) by 18 days.

(21) Appl. No.: 09/817,604

(22) Filed: Mar. 27, 2001

(65) Prior Publication Data

US 2002/0043129 A1 Apr. 18, 2002

Related U.S. Application Data

(63) Continuation of application No. 09/689,399, filed on Oct. 12, 2000.

(51) Int. Cl.[7] ............................................... F16H 48/00
(52) U.S. Cl. .......................................... 475/228; 74/425
(58) Field of Search .................... 74/425, 458; 475/220, 475/230, 228, 229

(56) References Cited

U.S. PATENT DOCUMENTS

| | | | |
|---|---|---|---|
| 1,600,738 A | 9/1926 | Rockwell | |
| 1,811,058 A | 6/1931 | Morgan | |
| 1,980,237 A | 11/1934 | Trbojevich | |
| 3,710,640 A | * 1/1973 | Stanger et al. | ................. 74/425 |
| 4,220,053 A | * 9/1980 | Barlow et al. | ........... 251/249.5 |
| 4,618,022 A | * 10/1986 | Hayashi | ...................... 180/249 |
| 5,605,071 A | * 2/1997 | Buchanan, Jr. | ............. 188/134 |
| 5,836,076 A | * 11/1998 | Duta et al. | ............... 29/407.05 |
| 5,988,006 A | 11/1999 | Fleytman | |
| 5,992,259 A | 11/1999 | Fleytman | |
| 6,074,322 A | 6/2000 | Fleytman | |
| 6,093,126 A | 7/2000 | Fleytman | |
| 6,098,480 A | 8/2000 | Fleytman | |
| 6,148,683 A | 11/2000 | Fleytman | |
| 6,354,395 B1 | * 3/2002 | Cheng et al. | ................ 180/444 |

\* cited by examiner

*Primary Examiner*—Ankur Parekh (57) ABSTRACT

A differential and drive axle assembly is provided with a worm/worm gear input. The worm/worm gear input provides for a small differential and drive axle assembly while also reducing the noise and weight of the assembly.

3 Claims, 14 Drawing Sheets

DRIVE AXLE ASSEMBLY WITH WORM GEARSET AND DIFFERENTIAL

This application is continuation of patent application Ser. No. 09/689,399 filed on Oct. 12, 2000.

FIELD OF THE INVENTION

The present invention relates generally to vehicle driveline systems, and more particularly, to an axle assembly having a worm gearset and a differential.

BACKGROUND OF THE INVENTION

Differentials are used in various vehicular driveline applications for transferring rotary power from an input to a pair of outputs while permitting speed differentiation between the outputs. For example, in rear-wheel drive (RWD) vehicles, the rear axle assembly includes a final drive differential unit having a carrier and a gearset connecting the carrier to left and right axle shafts. As is conventional, a hypoid gearset is used to transfer power from the propshaft to the carrier. The hypoid gearset includes a bevel-type ring gear secured to the carrier and a beveled meshed with the ring gear and driven by the propshaft. The size of the ring gear and the number of teeth associated with both the ring gear and pinion are selected to provide a predetermined speed reduction between the propshaft and the carrier. However, the size of the ring gear greatly dictates the packaging requirements for the differential housing of the axle assembly.

Worm gearsets, otherwise referred to as worm/worm gear transmissions, are known in the mechanical power transmission field. The worm gear is driven by the rotation of the worm with which it meshes. The rotational speed of the associated shaft of the worm gear is a function of the number of teeth on the worm gear and the number of threads on the worm. The worm may be single or multiple threaded. Conventional worm/worm gear transmissions have a worm gear with at least 24 teeth. In particular, the American National Standard "Design of Industrial Double-Enveloping Wormgears" (ANSI/AGMA-6030-C87) recommends 24 as the minimum number of gear teeth. Furthermore, the enveloping angle of known worm gears for one revolution of the thread of the worm is not more than 5 degrees. Moreover, standard enveloping worm/worm gear transmissions have been used in drive axle only for ratios of five and more (U.S. Pat. No. 1,980,237) Due to such high ratios, it has been considered impractical to use the worm gear as the driven member and the worm as the driving member to transfer power from the worm gear to the worm in drive axle applications. In U.S. Pat. No. 6,098,480 tooth surface of a worm gear has a first worm gear pressure angle and a second worm gear pressure angle. The first worm gear pressure angle is twice as large as the second worm gear pressure angle. Worm gear with this profile has high contact stress and very poor lubrication condition.

SUMMARY OF THE INVENTION

Accordingly, it is an object of the present invention to provide a drive axle assembly equipped with a differential and a worm gearset that is smaller than standard differential and drive axle assemblies. Since enveloping worm has a thread less than one revolution positioned in a mesh with the worm gear it creates suction for better lubrication. Suction becomes likely due to asymmetrical profile of the enveloping worm. (Standard enveloping worm always has a symmetrical design). Combination of enveloping worm having the thread less than one revolution along with housing leads to production of cooling liquid (oil) stream. Enveloping worm works like a screw pump. The housing helps to separate low-pressure oil from high-pressure oil, which increases liquid flow through teeth mesh.

It is a further object of the present invention to provide a drive axle assembly equipped with a differential that is lighter in weight and quieter in operation compared to conventional drive axle.

These and other objects of the present invention are obtained by providing a drive axle assembly with a unique worm-type input gearset. In particular, a drive shaft having an enveloping worm mounted thereto is meshed with a worm gear, which is fixed to an input member of the differential, where worm gear teeth has a tooth surface generated by a profile of the enveloping worm.

Preferably, the worm gear is secured to a carrier of the differential. The carrier of the differential supports a gearset including pinion gears, which are meshed with side gears, with each side gear secured to corresponding left and right axle shafts.

Enveloping worm/worm gear transmissions with a worm gear having less than twenty-four teeth have not been commercially used because it was believed impossible to build such a transmission due to the need to undercut the root of the worm gear tooth. Thus, those skilled in the art did not consider enveloping type worm gears with less than twenty-four teeth to be feasible for commercial applications. In contrast, the enveloping worm/worm gear transmissions of the present invention utilize a worm gear without undercut gear teeth because of a greater enveloping angle for one revolution of the worm thread.

With less than twenty-four gear teeth and a greater enveloping angle for one revolution of the thread, as compared to prior enveloping worm/worm gear transmissions, the minimum ratio for one thread could be reduced to two. In contrast, prior enveloping worm/worm gear transmissions had a minimum ratio of twenty-four for one thread of the worm and a ratio of five for five threads of the worm. The efficiency of the new worm/worm gear transmission is even greater than that of well-known hypoid gearsets that are used in low ratio right angle drives. Thus, the present invention can replace hypoid or bevel gearing in many applications by reason of the low ratio. In addition, this new worm/worm gear transmission is able to back drive by transmitting torque from the worm gear to the worm. For the same size, this invention has more than twice the capacity of traditional hypoid gearing.

In the present invention, the worm can be half or less than half of a split worm, which can have only one supporting shaft. Further, the worm gear can be half or less than half of a split worm gear, which may have a supporting shaft on only one side of the worm gear. Using only half or less than a half of the split worm gear or worm enables easier assembling of the worm with the worm gear. Half or less than a half of the worm indicates that worm thread has less than one revolution.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

As will be detailed, a drive axle assembly with a unique worm-type input gearset embodying the principles of the present invention will be described below with reference to FIGS. 24 through 26. Initially, however, the following discussion relates to FIGS. 1 through 23, which provide a detailed description of the worm/worm gear transmissions used for the worm-type-input gearset. Prior to specific consideration of the drawings, several unique features of the present invention can be discussed. In particular, the present invention is directed to gearsets having an enveloping worm gear with less than twenty-four (24) teeth meshed with the thread(s) of an enveloping worm to establish a low ratio, high efficiency transmission. The reason for using an enveloping-type of worm gear is that this gear could be with or without of enveloping profile. The main advantage for using the enveloping worm gear is more torque capacity. The worm gear has a natural tooth surface profile that is distinct from other types of tooth profiles. This configuration of the worm gear teeth is generated by the profile of the thread or threads of the worm. A computer model simulation can be utilized to generate the configuration of the worm gear teeth of the worm gear. Then gear could be manufactured using multi-tasking turning center or special machine. The worm gears also can be formed using known technique such as hobbing. When the worm gear teeth are generated from the profile of the worm threads having different lengths for the same enveloping angle (shortened), the profiles of the worm teeth are different.

The worm thread has a rolling action contact relationship with the teeth of the worm gear, which provides an increased efficiency. Furthermore, it is beneficial to have the pitch diameter in the center portion of the worm on the same order as the pitch diameter in the center of the worm gear. With standard worm designs, with more than one thread and a large enveloping angle, the inability to assemble the worm and worm gear was considered a major obstacle. With the worm and worm gear of the present invention, the worm and worm gear are easily assembled by properly orienting the worm thread and worm teeth. According to the present invention, the greater enveloping angle for one revolution of the worm thread and the same order of the pitch diameters of the enveloping worm and the enveloping type worm gear permits the use of worm gear teeth without undercut portions.

In accordance with one feature of the present invention, a worm and worm gear combination are utilized to transmit rotation with the smallest ratio between the worm gear teeth and one worm thread, In the past, it has been believed that at least 24 teeth were required for a worm gear to be used with a double enveloping worm/worm gear combination. However, in the present invention, the big difference from the traditional worm/worm gear is not only in the number of teeth, but also in the enveloping angle of the worm thread, which is used for generation of the profile for the worm gear teeth. This enveloping angle can be as large as 180 degrees for one revolution of the thread when the number of worm gear teeth is only two but is preferable larger than 15 degrees. Further details of the use of the unique worm/worm gear transmissions discussed herein can be found in U.S. Pat. Nos. 5,992,259 and 6,148,683 both of which are owned by the inventor hereof and which are expressly incorporated by reference hereto.

Figure 1:
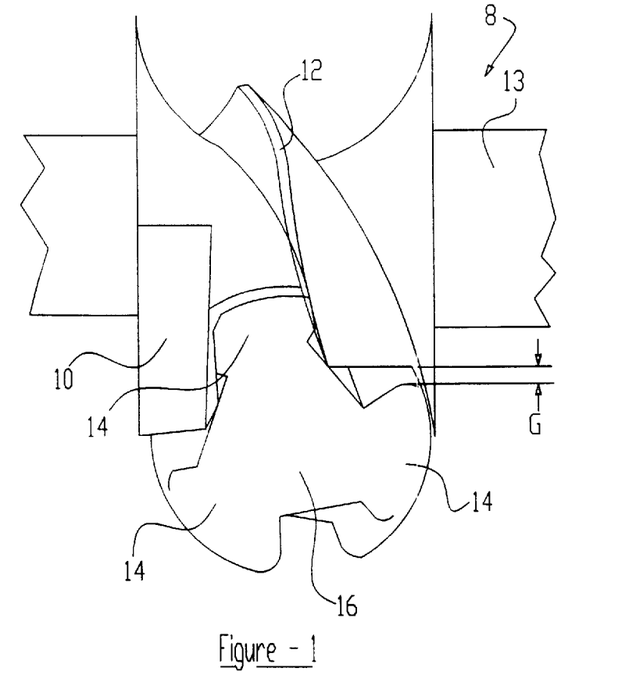
FIG. 1 is a sectional view of a worm/worm gear transmission with the worm gear having three teeth according to the principles of the present invention.

Referring now to the drawings, one embodiment of a worm/worm gear transmission 8 of the present invention is illustrated in FIG. 1. Transmission 8 has an enveloping worm 10 with at least one screw thread 12. Enveloping worm 10 is supported on a shaft 13. Thread 12 is engaged by at least one tooth 14 of an enveloping type worm gear 16, which is shown to have three teeth 14. As shown in FIG. 1, enveloping worm 10 has a single thread 12 in a preferred embodiment and worm gear 16 has three teeth 14 spaced about its circumference. As shown, a gap "G" exists between any tooth on worm gear 16 and thread 12 on enveloping worm 10. Enveloping worm 10 wraps around enveloping worm gear 16, and enveloping worm gear 16 also wraps around enveloping worm 10. Worm gear 16 and worm 10 are preferably enclosed in housing (not shown) in FIG. 1. Typically, the housing is made from metal and forms a reservoir for a lubricant to both lubricate and cool the gears, bearings, and seals for the unit. The housing forms a rigid support to mount the gears, bearings, seals and their associated parts (not shown). For this inventions housing helps to produce liquid flow.

Figure 17:
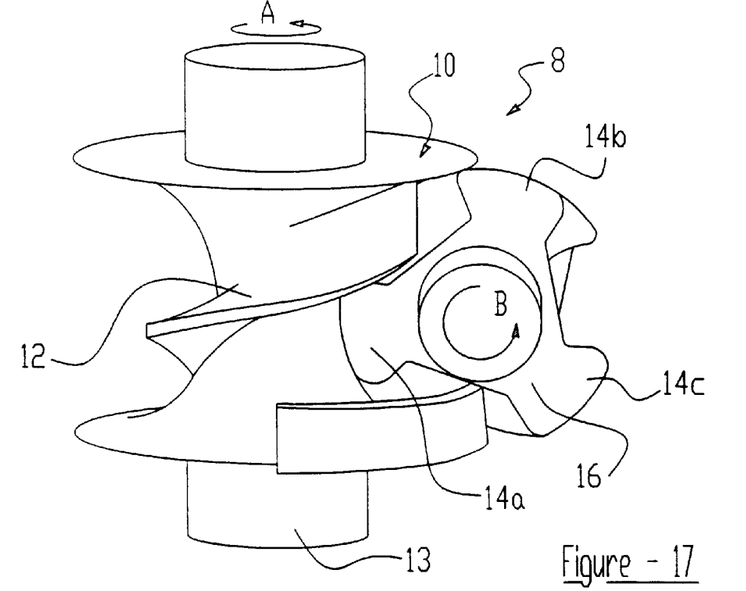
FIG. 17 is a perspective view of the worm/worm gear transmission shown in FIG. 1 with three worm gear teeth.

FIG. 17 is a perspective view corresponding with worm/worm gear transmission 8 shown in FIG. 1 and which includes an enveloping worm 10 having a single thread 12 and a worm gear 16 having three gear teeth 14. As can be understood, as worm 10 rotates in the direction of Arrow A, thread 12 which is engaged with tooth 4a presses downward on tooth 14a to cause rotation of worm gear 16 in the direction of Arrow "B". As worm gear 16 rotates, gear tooth 14b then comes into engagement with thread 12 and is acted on to cause further rotation of worm gear 16 as gear tooth 14a disengages from thread 12.

Figure 2:
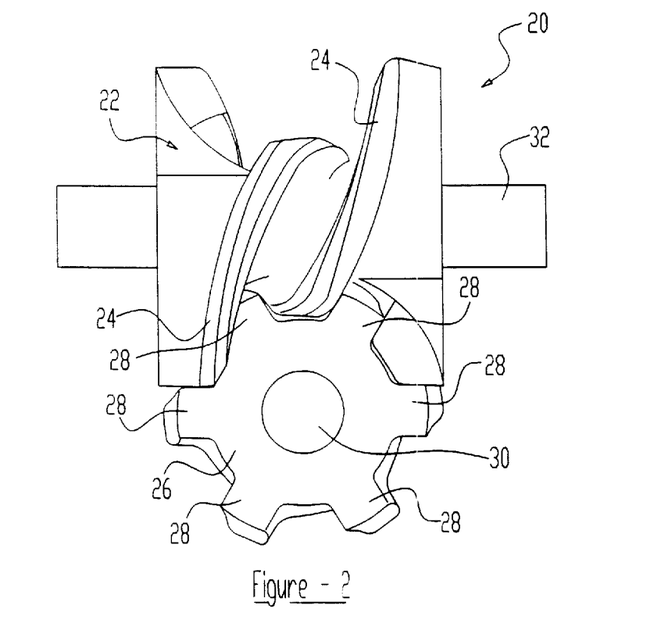
FIGS. 2 and 3 are views of a worm/worm gear transmission with the worm gear having six teeth according to the principles of the present invention.
Figure 3:
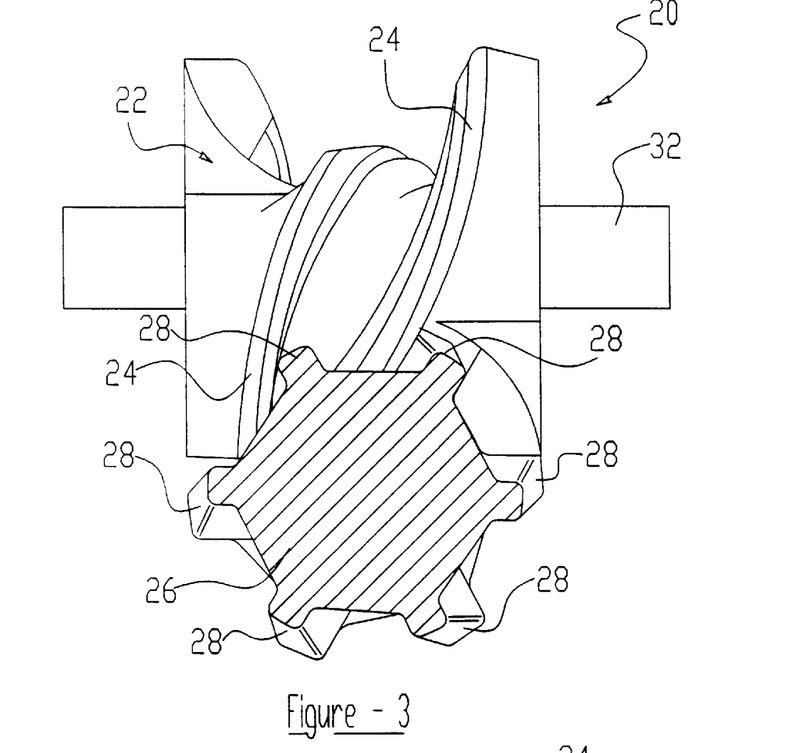

Another embodiment of a worm/worm gear transmission 20 of the present invention is illustrated in FIG. 2. This transmission has an enveloping-type worm 22 with two identical screw threads 24. Threads 24 are engaged by at least one tooth of an enveloping-type worm gear 26 shown to have six teeth 28. Worm gear 26 is connected to a shaft 30 while worm 22 connected to a shaft 32. In FIG. 3, worm gear 26 is shown in cross-section.

Figure 4:
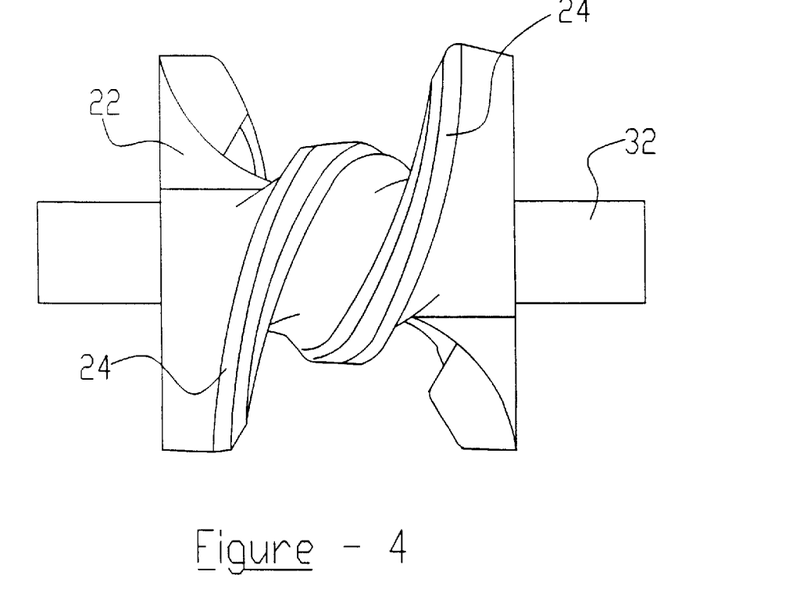
FIG. 4 is a side view of an enveloping worm having two threads.
Figure 18:
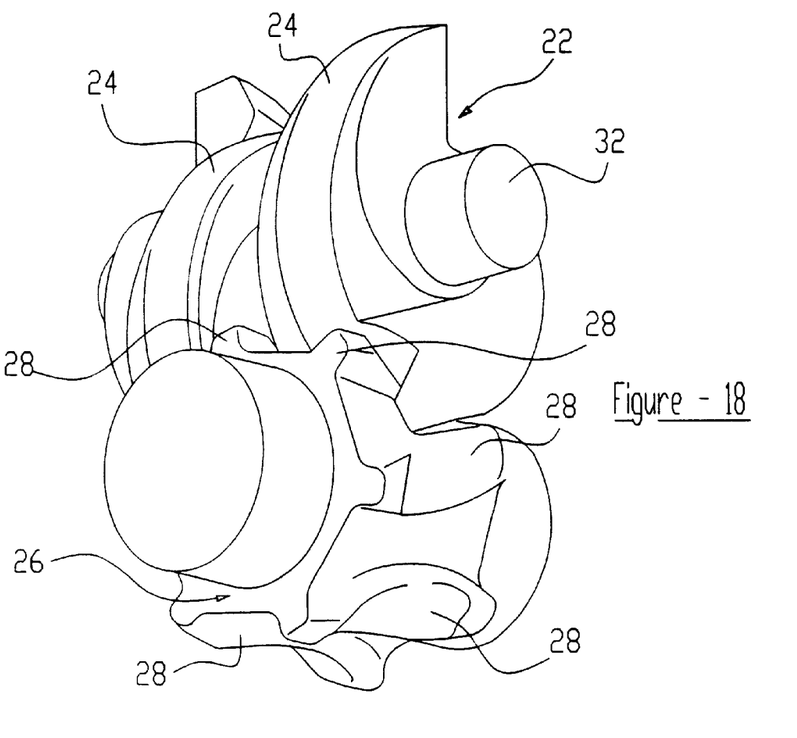
FIG. 18 is a perspective view of the worm/worm gear transmission shown in FIG. 2 with six worm gear teeth and two threads on the worm.

FIG. 4 is a side view of enveloping worm 22 with two identical threads 24 and supporting shaft 32. FIG. 18 is a perspective view corresponding with worm/worm gear transmission 20 shown in FIG. 2 and which includes enveloping worm gear 26 having six teeth 28 in mesh with enveloping worm 22 having two threads 24.

Figure 5:
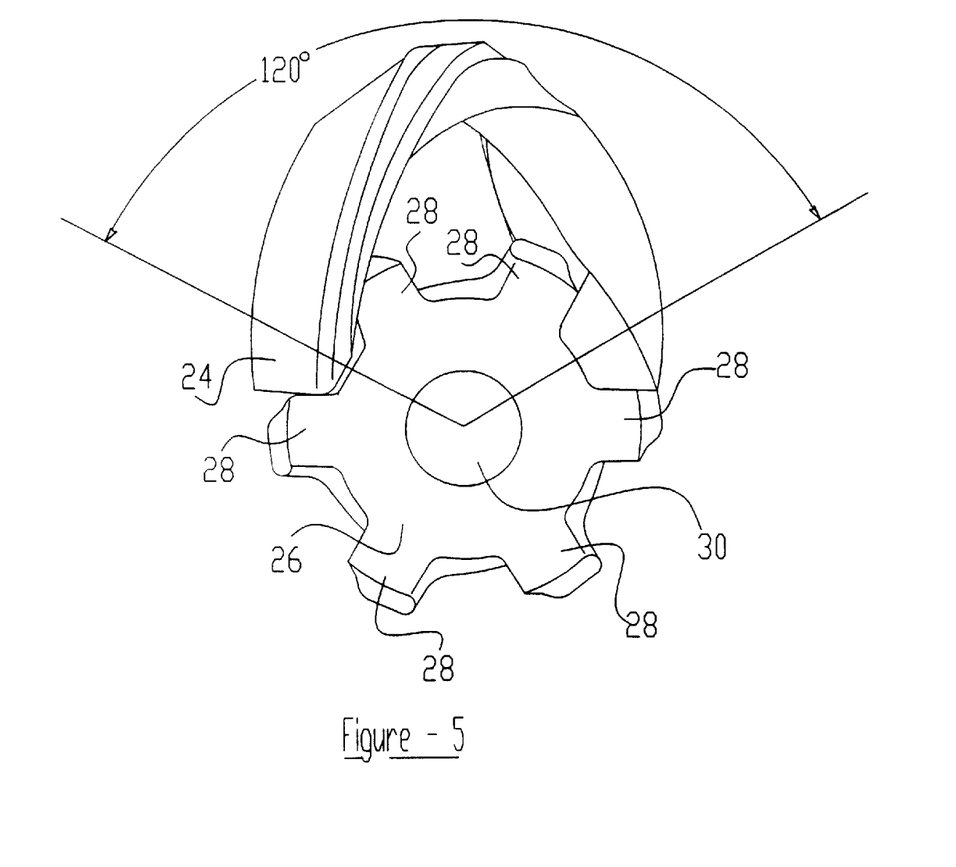
FIG. 5 illustrates an enveloping thread of a worm used for generating the gear teeth profile of the worm gear.

FIG. 5 shows an enveloping angle of 120° for enveloping worm thread 24 that is used to generate the six teeth 28 on worm gear 26. This enveloping worm thread 24 has one revolution of thread or 360° of revolution around its axis of rotation. For illustration of one revolution for the enveloping worm thread, we could use this example: the ends of worm threads have the same cross-sections but could be placed from one position to another position, which is a distinct 120°. This is possible by movement of the cross-section of the worm from one end along the worm thread 24 to another end. In this case, the cross-section will rotate 360°, around the axis of rotation for shaft 32.

Figure 21:
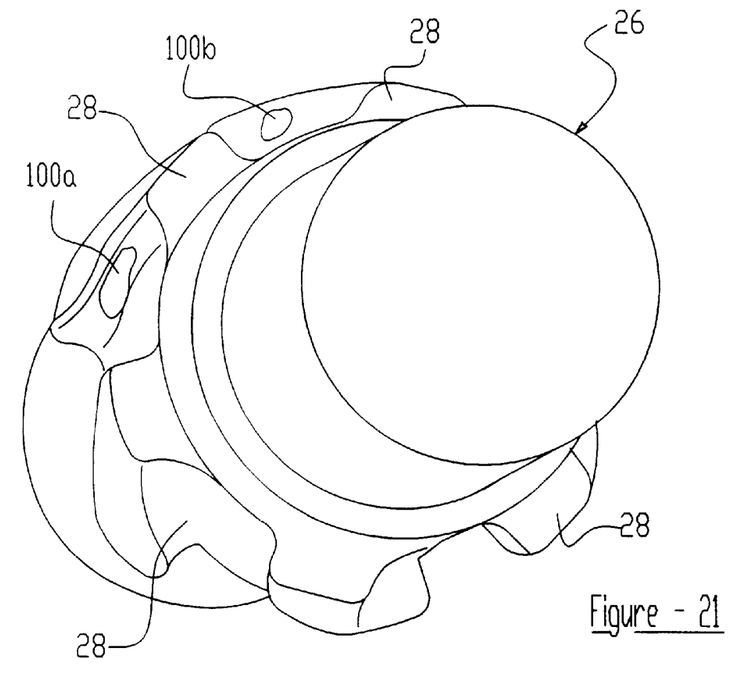
FIG. 21 is a perspective view of a worm gear with six teeth with darkened spots illustrated on the surface of the teeth to indicate the contact surface with the worm in mesh.
Figure 22:
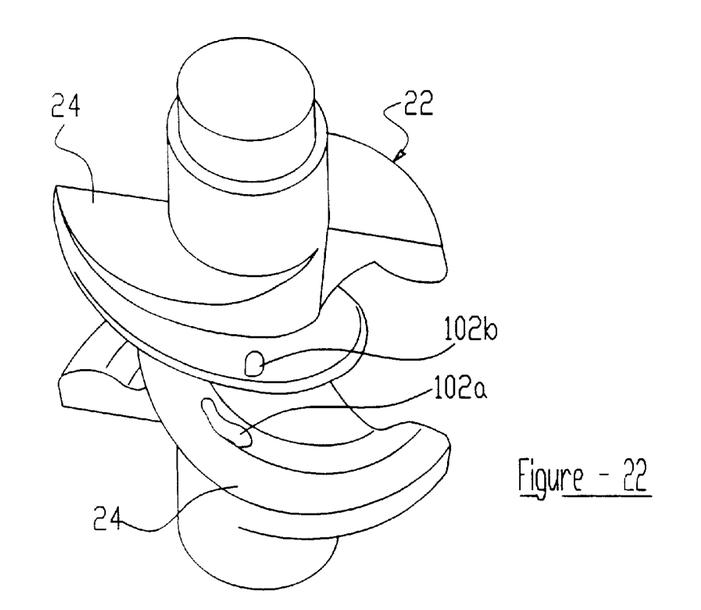
FIG. 22 is a perspective view of a worm with two threads with darkened spots illustrated on the surface of the thread to indicate the contact surface with the worm gear in mesh.

The enveloping worm/worm gear transmissions of the present invention for a worm gear having fewer than twenty-four teeth provides surface contact between the thread of the worm and the teeth of the worm gear as illustrated in FIGS. 21 and 22. FIG. 21 illustrates two surface contact spots 100a, 100b for a worm gear 26 having six teeth 28.

FIG. 22 illustrates two corresponding surface contact spots 102a, 102b for a worm 22 with two threads 24.

Figure 6:
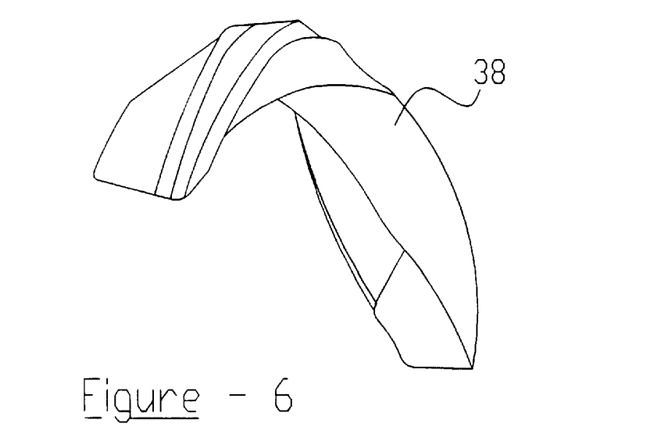
FIG. 6 is a view of a shortened thread of a worm used for generating the gear teeth profile of the worm gear.

FIG. 6 shows a worm thread 38 used for generating worm gear teeth and which is a shortened portion of a thread having an enveloping angle of 120°.

Figure 7:
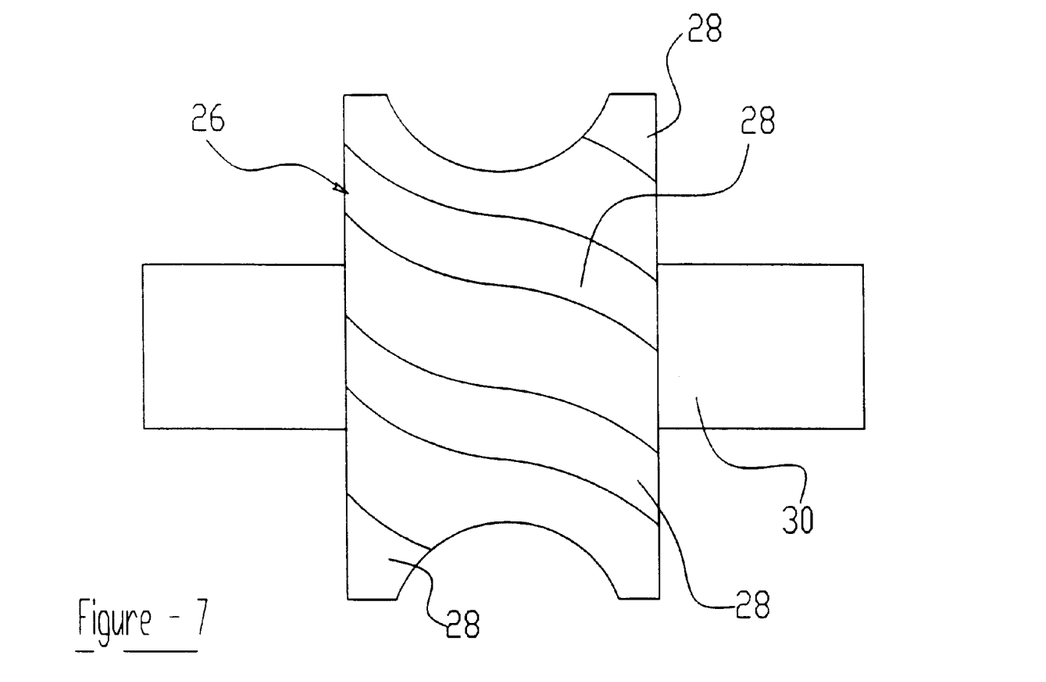
FIG. 7 shows an enveloping worm gear according to the principles of the present invention.

FIG. 7 shows a side view of enveloping worm gear 26 with six teeth 28.

Figure 8:
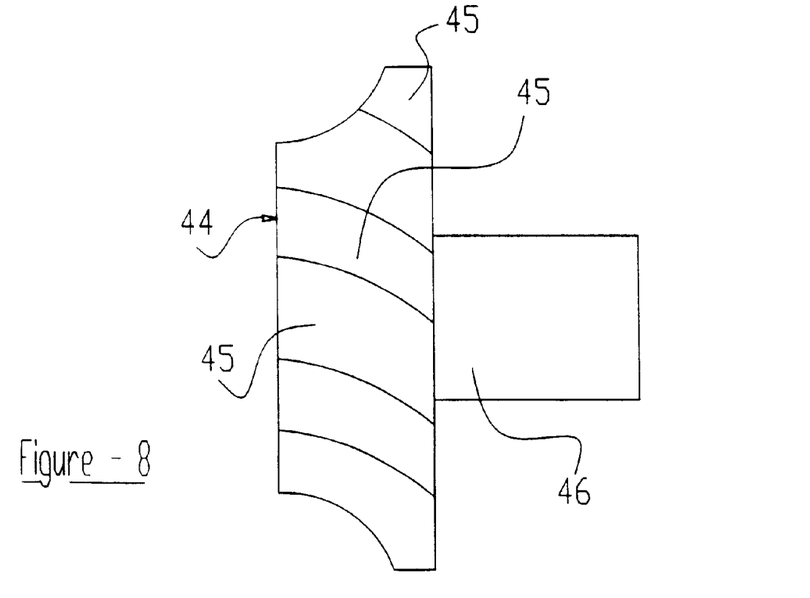
FIG. 8 shows a modified enveloping worm gear.

FIG. 8 shows an enveloping worm gear 44 having six teeth 34 that is modified from worm gear 26 shown in FIG. 7 by shortening the gear along its axis of rotation around a shaft 46. Practically, worm gear 44 could be longitudinally split into two halves and using only one shortened part or generated worm gear from blank, which is already shortened. Modified worm gear 44 is easy to assemble in a single reduction unit. This is very important for gears with a small pressure angle when it is difficult to assemble an enveloping worm with an enveloping type of worm gear. For many applications, only the modified worm gear 44 may be adequate. Enveloping worm gear 44 could connect to drive shaft 46 for supporting worm gear 44 from only one side or could be supported on both sides.

The bodies of enveloping worm gears 26 and 44 have axially extending end flanges that hook underneath flanges of adjacent collars to hold the worms in place. One or both of the worm and worm gear bodies are keyed or otherwise fastened to the shaft for driving or being driven. Relatively slight longitudinal movement of one or both the worm and worm gear allows for disassembling the entire worm gear—collars—shaft assembly.

In the present invention, it is preferred that the ratio of the number of teeth 14 on worm gear 16 relative to the number of threads 12 on worm 10 is 5 and less. Most preferably, the ratio is three or even less, as shown. It is possible that only two teeth 14 need to be utilized on worm gear 16. The worm/worm gear transmission used in the present application could also self-lock. The term "self-locking" as it is utilized in this application to describe the inventive worm and worm gear combinations, means that the teeth of the worm gear, when in contact with the thread of the worm, are not capable of rotating the worm about the axis of the worm. For example, teeth 14 do not slip on thread 12, thereby causing thread 12 to rotate about its own axis. By carefully selecting the material of teeth 14 and threads 12, and the respective angles, a worker of ordinary skill in the art would be able to achieve this goal. The worm/worm gear transmission of the present invention particularly lends itself to a geometric as opposed to a purely frictional type self-locking device.

Figure 9:
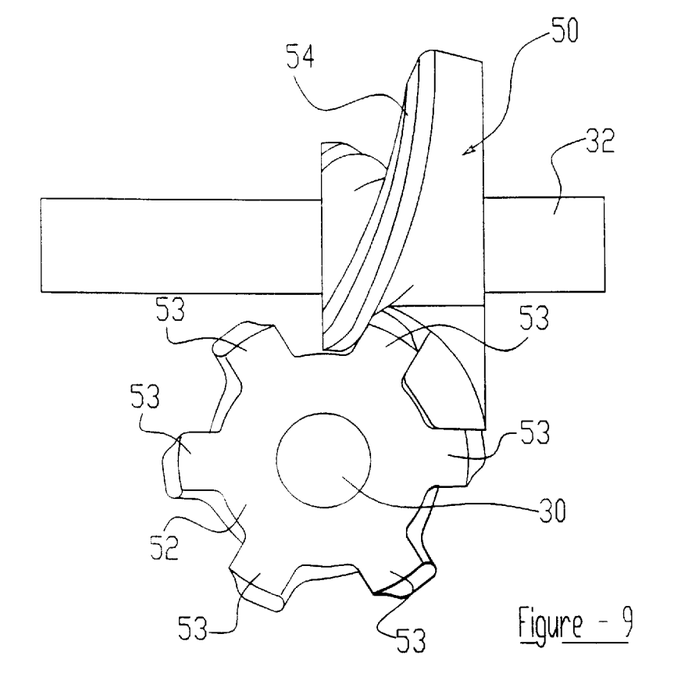
FIGS. 9 and 10 show a worm/worm gear transmission utilizing a modified worm.

FIG. 9 shows a shortened enveloping worm 50 with an enveloping type of worm gear 52, which has a different profile of teeth 53, compared to teeth 28 of worm gear 26 (shown in FIGS. 2 and 7) even for the same number of worm gear teeth. This difference is due to the fact that the profile of teeth 53 was generated by a shortened enveloping thread 54 for shortened enveloping worm 50.

Figure 10:
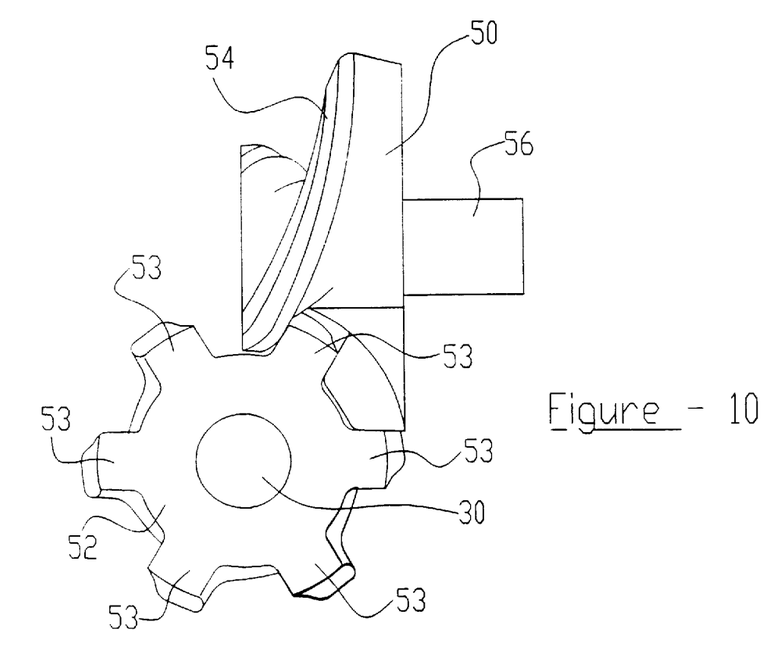
Figure 11:
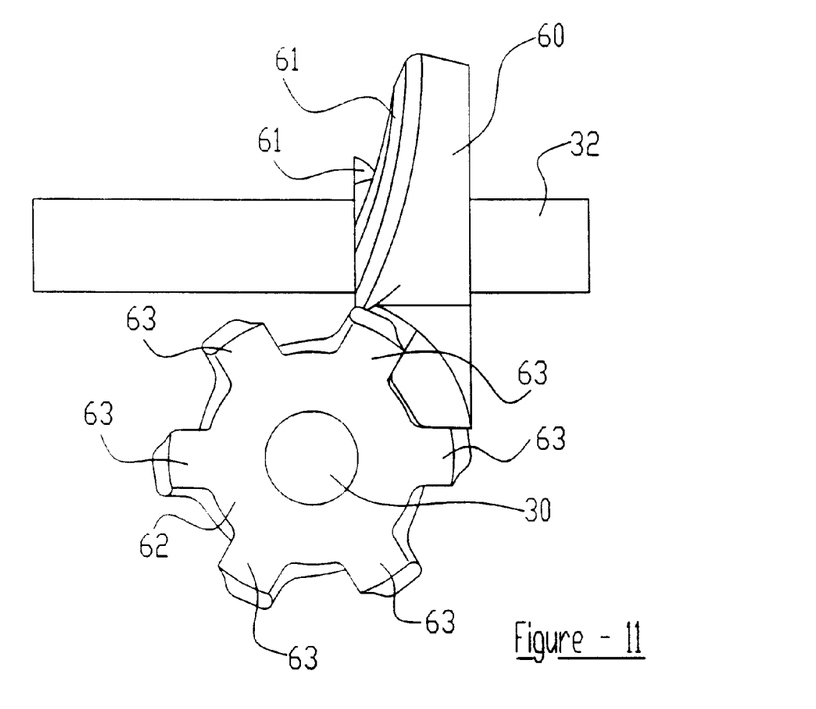
FIG. 11 shows a worm/worm gear transmission with a modified worm in an off-center position.
Figure 12:
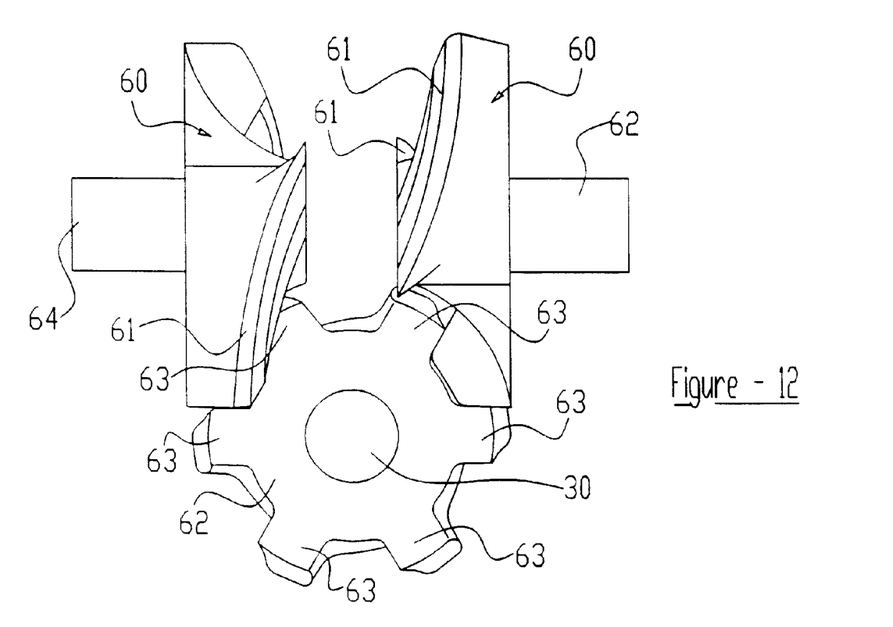
FIG. 12 shows a worm/worm gear transmission with two modified worms in off-center positions.

In FIG. 10, enveloping worm 50 is connected to a drive shaft 56 which supports worm 50 from one side. FIG. 11 shows a view of a worm/worm gear transmission with a modified enveloping split worm 60 having two threads 61 in an off-center position relative to an enveloping-type worm gear 62 having six teeth 63. In contrast, FIG. 12 shows a side view of a worm/worm gear transmission with two modified worms 60 having two threads 61 in off-center positions and respectively connected to different drive shafts 62 and 64 and each meshingly engaged with worm gear 62.

Figures 13, 14:
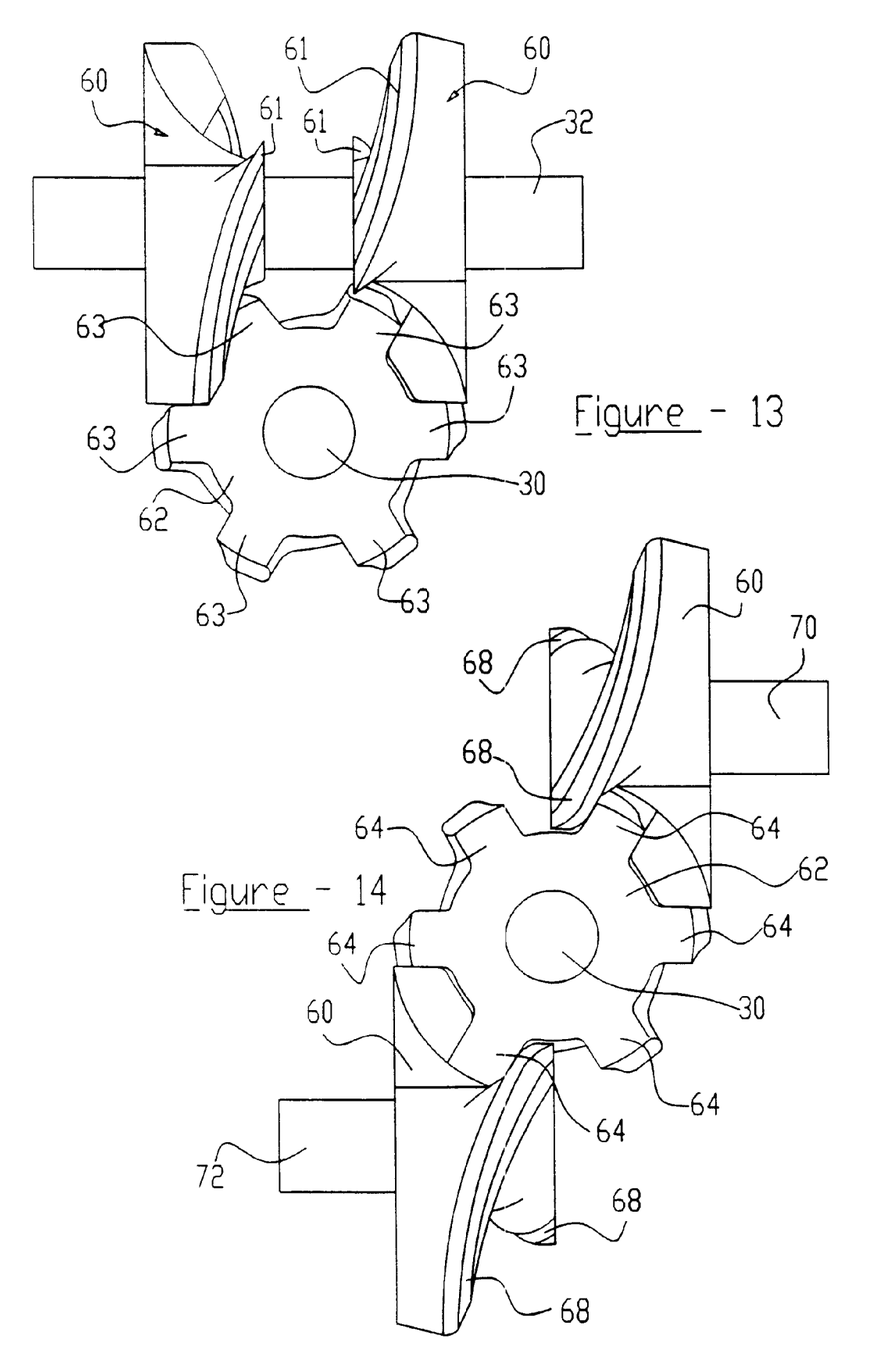
FIG. 13 shows a worm/worm gear transmission with two modified worms aligned on the same axis of rotation and connected to a common shaft.
FIG. 14 shows a worm/worn gear transmission with two modified worms located on different axes of rotation.

FIG. 13 shows a view of a worm/worm gear transmission with two modified worms 60 in off-center positions placed on the same axis of rotation and both connected to drive shaft 32. When the modified worms are connected to a common shaft with a different angular phase of the threads, it means that in motion, the threads of one worm are entering mesh with the worm gear teeth while the thread of the other worm are released from mesh at different times. The purpose of the phase difference is to increase the contact ratio and to provide smooth mesh.

FIG. 14 shows a view of a worm/worm gear transmission with two modified worms 60 having worm threads 68 each placed on different axes of rotation and connected to different drive shafts 70 and 72. Each of worms 60 meshing engages the worm gear 62 having teeth 64.

Figure 15:
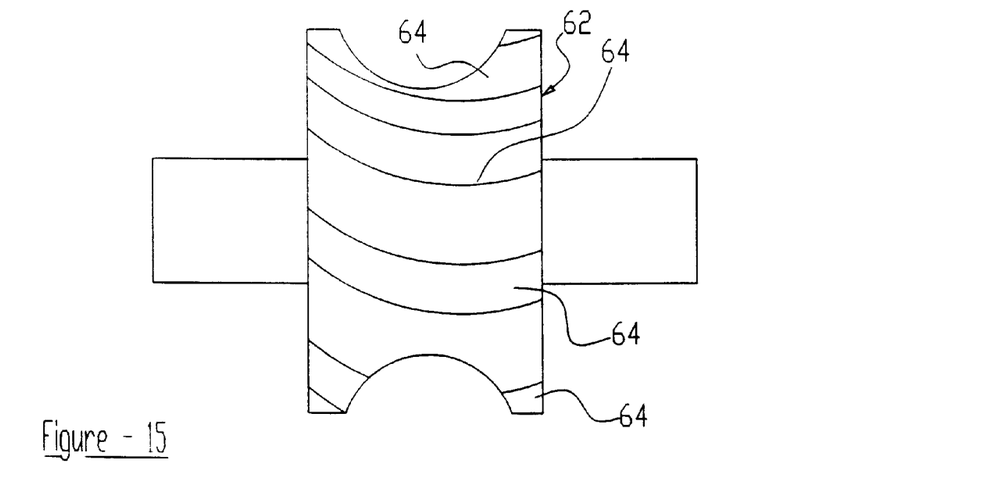
FIG. 15 shows an enveloping worm gear with a different tooth profile.

FIG. 15 shows a side view of an enveloping worm gear 62 with teeth 64 have a different profile which is generated by enveloping thread 68 of worm 60 as shown in FIG. 14.

Figure 16:
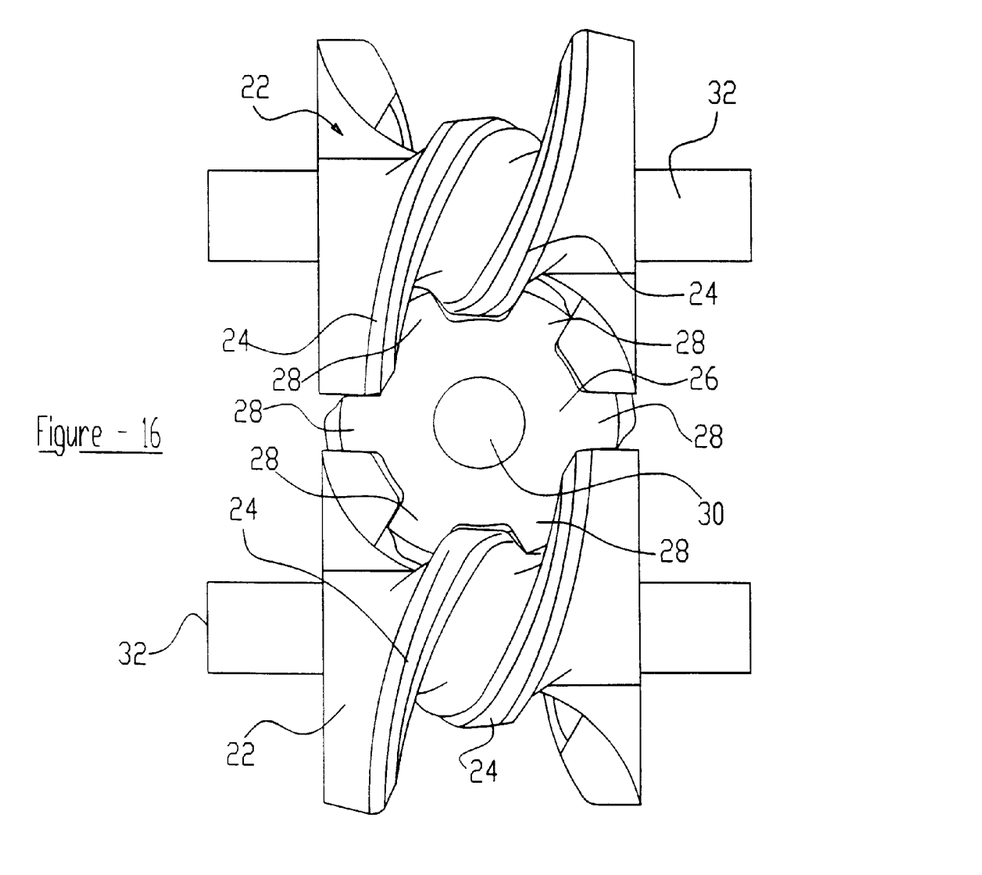
FIG. 16 shows a worm/worm gear transmission with two enveloping worms placed on different axes of rotation.

FIG. 16 shows a view of a worm/worm gear transmission with two enveloping worms 22 having corresponding worm threads 24 placed on different axes of rotation and which are connected to drive shafts 32 and 23. Each of worms 22 meshingly engages enveloping worm gear 26

Figure 19:
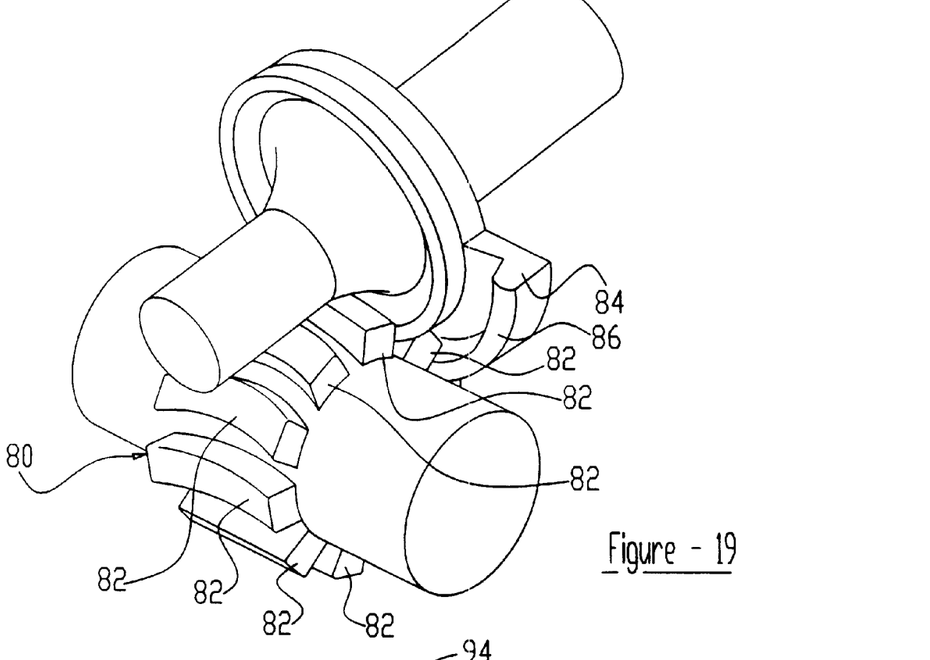
FIG. 19 is a perspective view of a worm/worm gear transmission with ten worm gear teeth and with a single thread worm.

FIG. 19 is a perspective view of a worm/worm gear transmission including worm gear 80 having ten teeth 82 in mesh with an enveloping split worm 84 including a thread 86.

Figure 20:
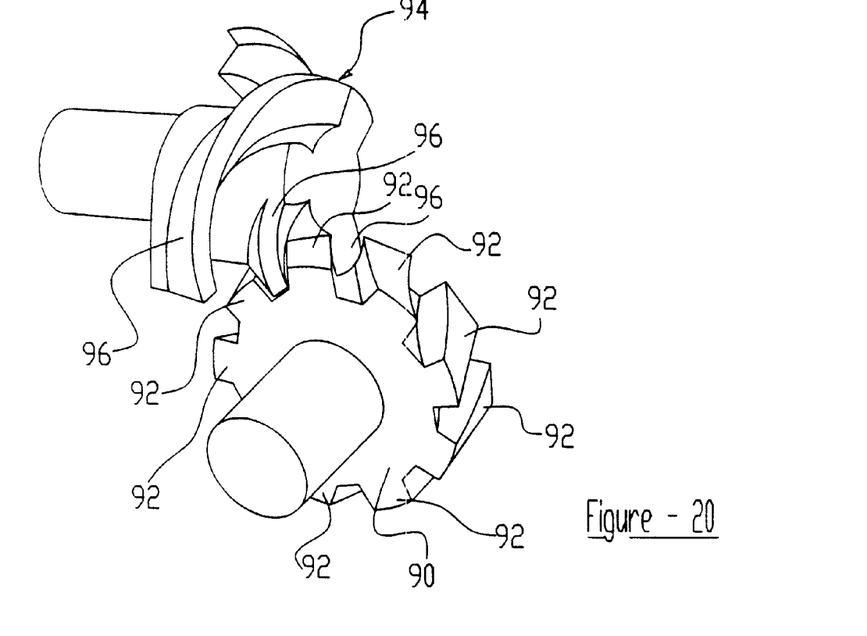
FIG. 20 is a perspective view of a worm/worm gear transmission with nine worm gear teeth and a modified worm having three threads on the worm.

FIG. 20 is a perspective view of a worm gear 90 having nine teeth 92 in mesh with a modified enveloping split worm 94 having three threads 96.

Figure 23:
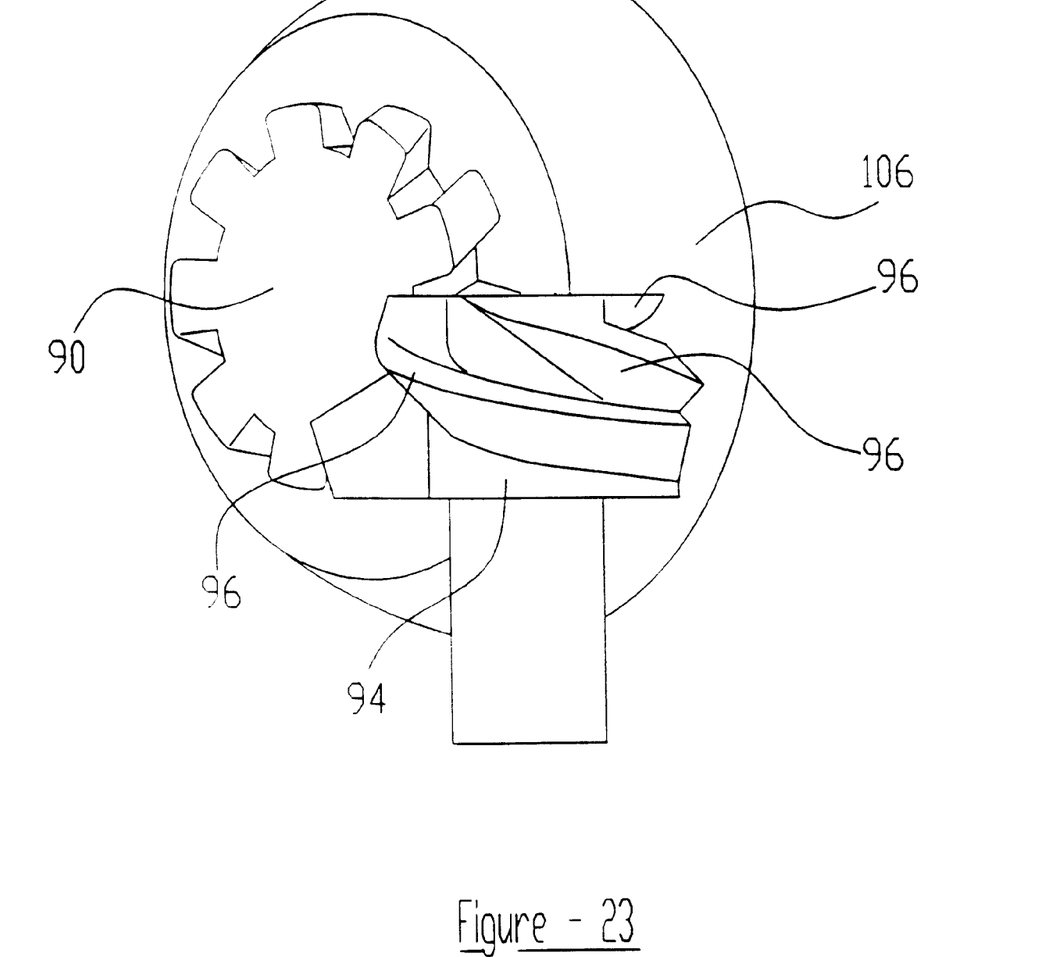
FIG. 23 illustrates the size difference of the worm/worm gear transmission of FIG. 20 in comparison to the size of a typical hypoid gear.
Figure 24:
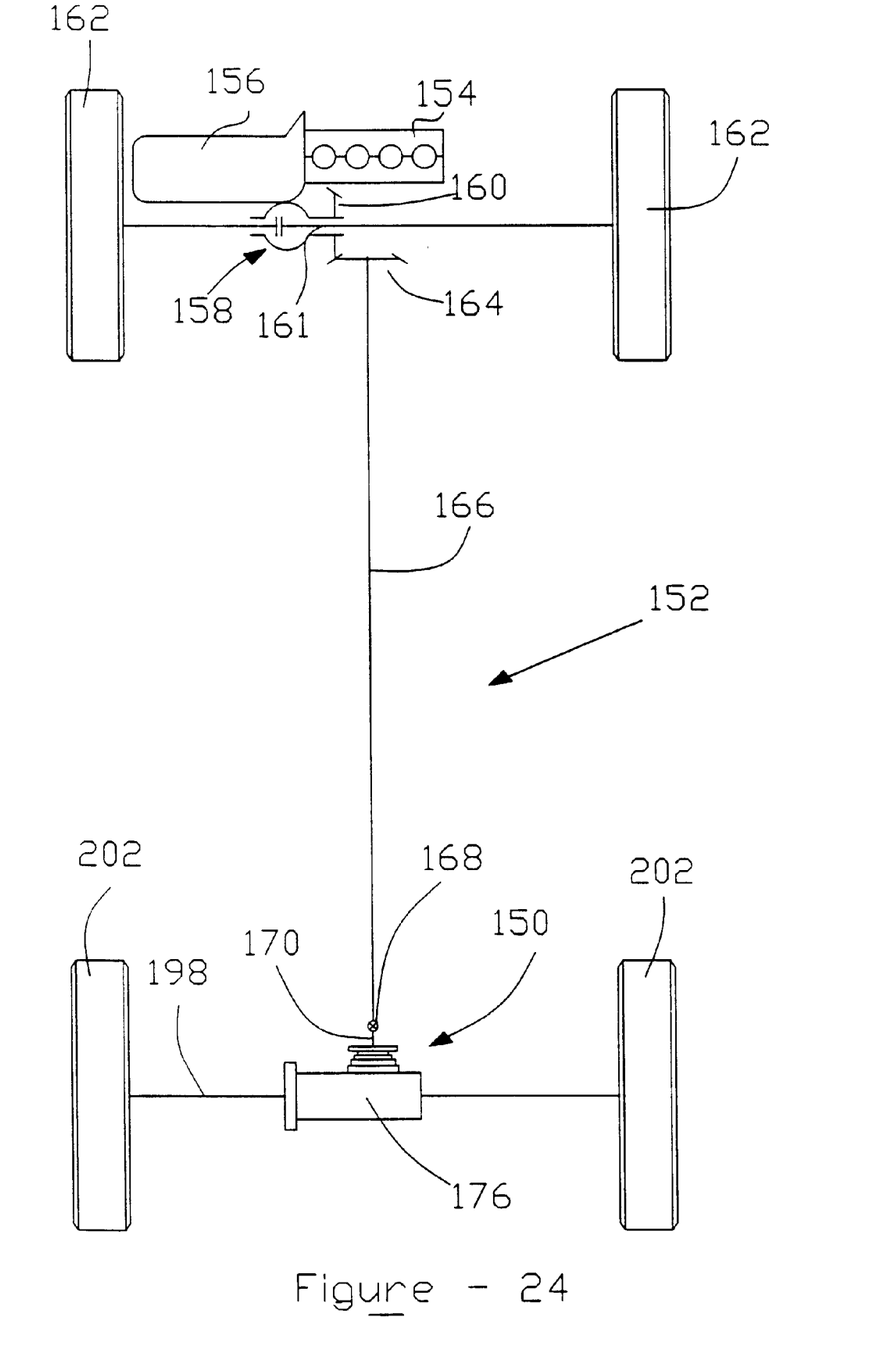
FIG. 24 is a schematic diagram of a vehicle powertrain having a differential and drive axle assembly according to the principles of the present invention.

FIG. 23 illustrates the size difference of a worm/worm gear transmission as shown in FIG. 20 in comparison with the size of a typical hypoid gear 106.

For the inventions described in the present patent application, there could be two different types of operations. When the worm/worm gear transmission does not incorporate the self-lock feature, the motion could be provided from the drive shaft through enveloping worm 12 and enveloping-type worm gear 16 to an output shaft or back from the output shaft to the drive shaft 32. The same operation is applicable for motion from the drive shaft to the driven shafts or from the driven shafts to drive shaft of the various other embodiments shown. Alternatively, when the worm/worm gear transmission does include the self-lock feature, rotary motion can be provided only from the drive shaft to the enveloping worm and through the enveloping type worm gear to the output shaft. Thus, the worm/worm gear transmissions shown in FIGS. 12, 14 and 16, with independent drive shafts connected to the worms could be used in a split-power transmission to transmit energy from a high-speed engine to a rotor drive shaft.

In the present invention, a self-locking worm/worm gear combination can have a worm gear to worm thread ratio that is preferably 1 to 10 and less. Such a system is desirable so that each one of the worm and worm gear combinations described above can transmit very high torque loads when compared to prior systems.

In the past, the worm and worm gears have been formed of materials having low coefficients of friction; worm gears typically were made only from bronze. With the present invention however, the worm and worm gear can be made from a high strength material, such as steel. The preferable shape of the teeth and threads for the worm gear and the worm are shown in the drawings, but could be different. Even so, a worker of ordinary skill in the art would recognize that other shapes would come within the scope of this invention.

In the present application, it is a surface-to-surface contact between the worm gear teeth and the worm thread that increases the torque capacity of the enveloping worm/worm gear transmission. This became possible when the enveloping angle of the worm thread for generation of the worm gear teeth is more than 15 degrees, or even 30 degrees. The efficiency of the new worm/worm gear transmission is equal or even greater than in well-known hypoid gearing, which are used in right angle drives with low ratio. For back drive, when the worm gear is a driven member and the worm is a driving member, this worm/worm gear transmission also has high efficiency compared to a hypoid gear set.

It was confirmed by testing of steel worm/worm gear transmission constructed according to the present invention that such transmissions could replace hypoid or bevel gearing in many applications. The lower noise of the worm/worm gear transmission compared with hypoid and bevel gear transmissions make using the worm/worm gear transmission of the present invention more beneficial, in particular, in helicopter or in motor vehicle powertrain applications. For the same size, this invention can provide more than twice the capacity of hypoid gearing, where the hypoid gear also has more than 24 teeth. The smaller number of teeth of the present invention than in a hypoid gear of the same circumference makes each tooth thicker and therefore stronger. In the illustration shown in FIG. 23, a modified worm 94 with three threads 96 is shown which has a shape and size similar to a pinion of a hypoid transmission, Assuming the modified worm 94 is the same size as the pinion of a hypoid gear set, the diameter of hypoid gear 106 is twice the diameter of worm gear 90. Up to now, those skilled in the art were of the opinion that an enveloping type worm gear with less than twenty-four teeth would not work and/or that it presented an insurmountable barrier to commercial applications. The double-enveloping worm/worm gear transmissions, as described above, can be utilized as an input gearset to a differential of the type used in a drive axle assembly, as is shown and described with reference to FIGS. 24–26. It should be understood that the particular drivetrain arrangement shown in FIG. 24 is merely exemplary of but one system to which the present invention can be applied. In particular, a drive axle assembly 150 of the present invention equipped with differential 158 is shown as part of a vehicle drivetrain 152 which includes an engine 154 and a transmission 156. The output of transmission 156 drives a front differential 158 that has an output gear 160 fixed to its carrier 161. Differential 158 delivers rotary power to front wheels 162 and facilitates speed differentiation there between while output gear 160 mates with a transfer gear 164 fixed to a rear propeller shaft 166. Propeller shaft 166 is connected through at least one universal joint 168 to drive axle assembly 150. Drive axle assembly 150 includes a drive shaft 170, which has a splined first end that is adapted to mate with a yoke of universal joint 168. Drive shaft 170 is supported for rotation within an axle housing 176 by a pair of axially spaced bearing assemblies.

Figure 25:
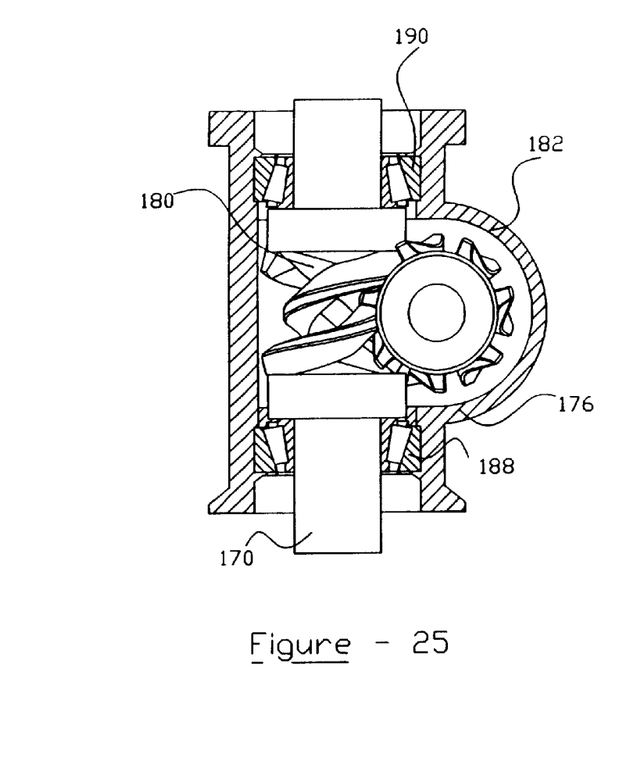
FIG. 25 is a perspective view of the housing with enveloping worm and enveloping type worm gear according to the principles of the present invention.
Figure 26:
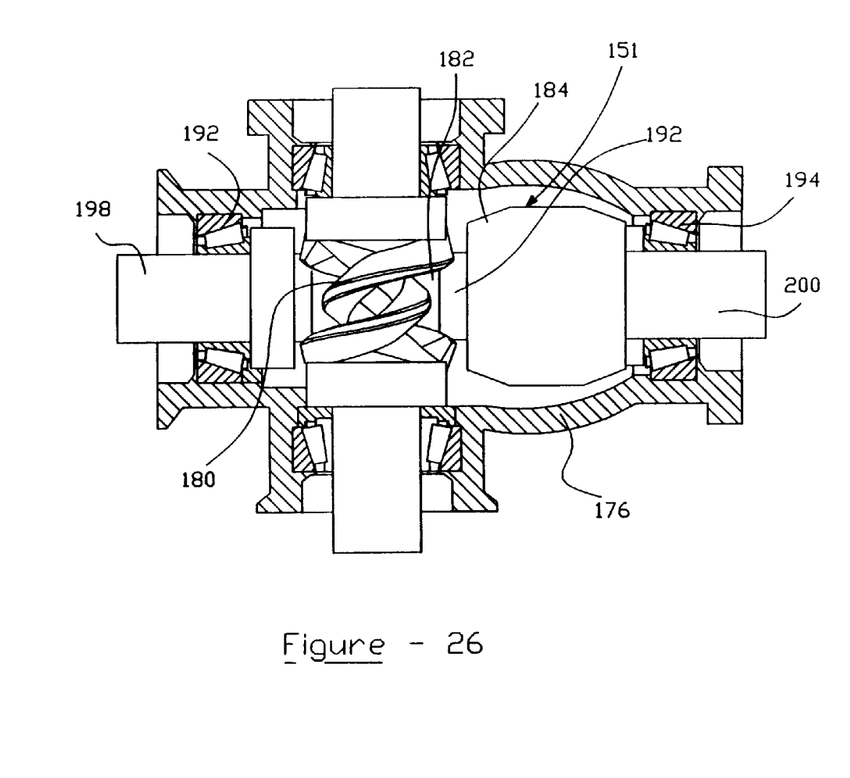
FIG. 26 is a perspective view with part of the housing of the differential and drive axle assembly being removed.

As best seen in FIG. 25, FIG. 26 a worm gearset includes an enveloping worm 180 fixed to drive shaft 170 and which is in engagement with an enveloping worm gear 182 fixed to a carrier 184 of differential 151. Carrier 184 is rotatably mounted within housing. Differential 151 includes a shaft mounted to carrier 184. Standard gear differential with bevel gears includes a pair of pinion gears meshingly engage a pair of side gears (not shown) and which rotatable supports a pair of pinion gears. Pinion gears meshingly engage a pair of side gears. As is known in the art, side gears are each attached to a corresponding one of left and right axle shaft 198 and 200 that are also rotatably supported by carrier 184.

Left and right axle shafts 198 and 200 are each connected to a corresponding one of a pair of rear wheels 202. Enveloping worm 180 and worm gear 182 are preferably of the type described above wherein the ratio between the number of gear teeth of worm gear 182 and the number of threads on worm 180 is low. Preferably, the number of gear teeth on worm gear 182 is less than twenty-four. Enveloping worm 180 placed in housing by a first bearing 188 and a second bearing 190 and worm gear placed in housing by a first bearing 192 and a second bearing 194.

Worm 180 and worm gear 182 allow for a much more compact housing 176 to be utilized in comparison with conventional differentials that, as noted, utilize a large ring gear that is attached to the carrier in order to provide an input to the differential. With enveloping worm 180 and enveloping worm gear 182 being utilized to provide input to axle assembly 150, axle assembly 150 can be made smaller and lighter in weight than conventional axle assemblies.

As seen, differential 151 was utilized as part of the final drive assembly in a rear drive axle. However, differential 152 could be used in place of front differential 158 such that one of worm 200 and worm gear 202 could be secured to carrier 161 with the other thereof secured to an output of transmission 156. In this arrangement, worm gearset would replace a traditional ring gear and pinion arrangement associated with transaxles.

Several embodiments of the present invention have been disclosed. A worker of ordinary skill in the art would recognize that certain modifications would come within the scope of this invention. The invention being thus described, it will be obvious that the same may be varied in many ways. Such variations are not to be regarded, as a departure from the spirit and scope of the invention, and all such modifications as would be obvious to one skilled in the art are intended to be included within the scope of the following claims.

I claim:

1. A drive axle assembly for transferring drive torque from a power source to a pair of alxeshafts, comprising:
    a drive shaft adapted to be driven by the power source;
    a differential having an input member adapted for connection to the pair of axleshafts;
    a worm gearset having an enveloping worm driven by said drive shaft and an worm gear driving said input member of said differential, said worm gear with less than twenty four teeth having a tooth surface generated by a profile of the enveloping worm;
    a housing for said enveloping worm positioned in a mesh with said worm gear.

2. The drive axle assembly of claim 1 wherein said enveloping worm having a thread less than one revolution positioned in a mesh with said worm gear.

3. The drive axle assembly of claim 1 wherein said input member of said differential is a carrier.

* * * * *